United States Patent [19]
Rabodzei et al.

[11] 3,818,233
[45] June 18, 1974

[54] X-RAY TELEVISION MEASURING MICROSCOPE

[76] Inventors: Nikolai Vasilievich Rabodzei, Institutskaya ulitsa, 6a, kv. 39; Evgeny Mikhailovich Ljubimov, ulitsa Lenina, 14, kv. 21; Mikhail Nikolaevich Nadobnikov, ulitsa Vokzalnaya, 21, kv. 7; Alexandr Alexandrovich Krokhin, ulitsa Tsentralnaya, 12, kv. 8, all of Fryazino Moskovskoi oblasti, U.S.S.R.

[22] Filed: June 28, 1972

[21] Appl. No.: 267,256

Related U.S. Application Data

[63] Continuation of Ser. No. 52,819, July 7, 1970, abandoned.

[52] U.S. Cl.................. 250/444, 250/455, 250/492
[51] Int. Cl............................................. H01j 37/00
[58] Field of Search .......... 250/444, 445, 446, 450, 250/451, 454, 455, 456, 492

[56] References Cited
UNITED STATES PATENTS
3,340,397   9/1967   Johnston ........................... 250/455

*Primary Examiner*—James W. Lawrence
*Assistant Examiner*—C. E. Church
*Attorney, Agent, or Firm*—Holman & Stern

[57] ABSTRACT

An X-ray television measuring microscope of the type including a source of X-radiation, a protective working chamber for accommodating objects to be examined, an X-ray sensitive television converter for converting the X-ray shadow image of the object being examined into a video signal, the improvement comprising at least one optical sighting device for observation of the external portions of the object being examined which are not revealed in the X-ray image, the optical axis and sighting plane of said sighting device being fixed relative to the axis of the beam of X-radiation.

4 Claims, 2 Drawing Figures

X-RAY TELEVISION MEASURING MICROSCOPE

This is a continuation of application Ser. No. 52,819, filed July 7, 1970, now abandoned.

The present invention relates to measuring instruments and more specifically to X-ray television measuring microscopes which make it possible to observe in an enlarged view and to measure dimensions of portions of the inner structure of opaque objects.

Known in the art are X-ray television measuring microscopes comprising a source of X-radiation, a protective working chamber in which the object to be examined is located and a television converter sensitive to X-rays which converts an X-ray shadow image of the examined object into a video signal.

The X-ray television converter operates within a closed television system, while the enlarged images of the inner structure of the object being examined are observed on a screen of a receiver video system (television monitor).

The working chamber of the X-ray television microscope has a window for observing the position and movements of the object being examined effected with the help of remote control devices (manipulators).

The known X-ray television microscope makes it possible not only to observe the images of the inner structure of the object being examined, but also to see the actual position of this object simultaneously in two projections (along the axis of the X-radiation and normal thereto) through the window in the working chamber, said position corresponding to the above image.

The attainment of two projections is provided by placing inside the working chamber between the source of radiation and the examined object an inclined mirror made of a material transparent for X-radiation which shows the position of the examined object at the side of the source of X-radiation.

On comparing the images of the inner structure observed on the screen of the television monitor with the positions of the examined object observed through the window and corresponding to these images, it is possible to determine the disposition of the portions or latent defects within the examined object but not their actual dimensions. When employing the known microscope, the accurate geometric measurements inside the opaque objects being examined cannot be made due to the following reasons:

the image of the inner structure of the object observed on the television monitor screen does not represent the correct geometrical dimensions of the object under examination due to the known projection distortions of an X-ray shadow image and the distortions of the image on the television screen;

the images observed on the screen and the images observed through the window are presented in different scales.

The specific object of the invention is to provide such an X-ray television microscope which is equipped with devices making it possible to effect accurate measurements not only between the portions of the inner structure of the examined object observed on the monitor screen but also between portions of the inner structure and other components seen only during the direct visual observation of the object through the window of the working chamber.

This and other objects of the invention are attained by providing an X-ray television measuring microscope which, according to the invention, is equipped with at least one optical device for sighting the external components of the examined object which are not revealed in the X-ray image, the optical axis and sighting plane of said sighting device being rigidly fixed relative to the axis of the beam of X-radiation.

It is expedient that the axis of the optical sighting device be normal to the axis of the beam of X-radiation and to the direction of the measuring displacement of the object being examined, in which case the measuring displacement is the movement of the object inside the chamber followed by the measurement of the distances of movement of the object.

It is also expedient that the optical sighting device be capable of moving in the direction parallel to the axis of the radiation beam.

In some cases it is advantageous to locate the optical axis of the optical sighting device parallel to the axis of the beam of X-radiation, while the optical sighting device itself is close to the X-ray sensitive television converter capable of moving simultaneously with the device.

The invention makes it possible to measure the distances between the external visible portions of an opaque object and the invisible internal portions of the same.

The invention may best be understood from the following description of some particular embodiments thereof, reference being made to the accompanying drawings, in which.

Figure 1:
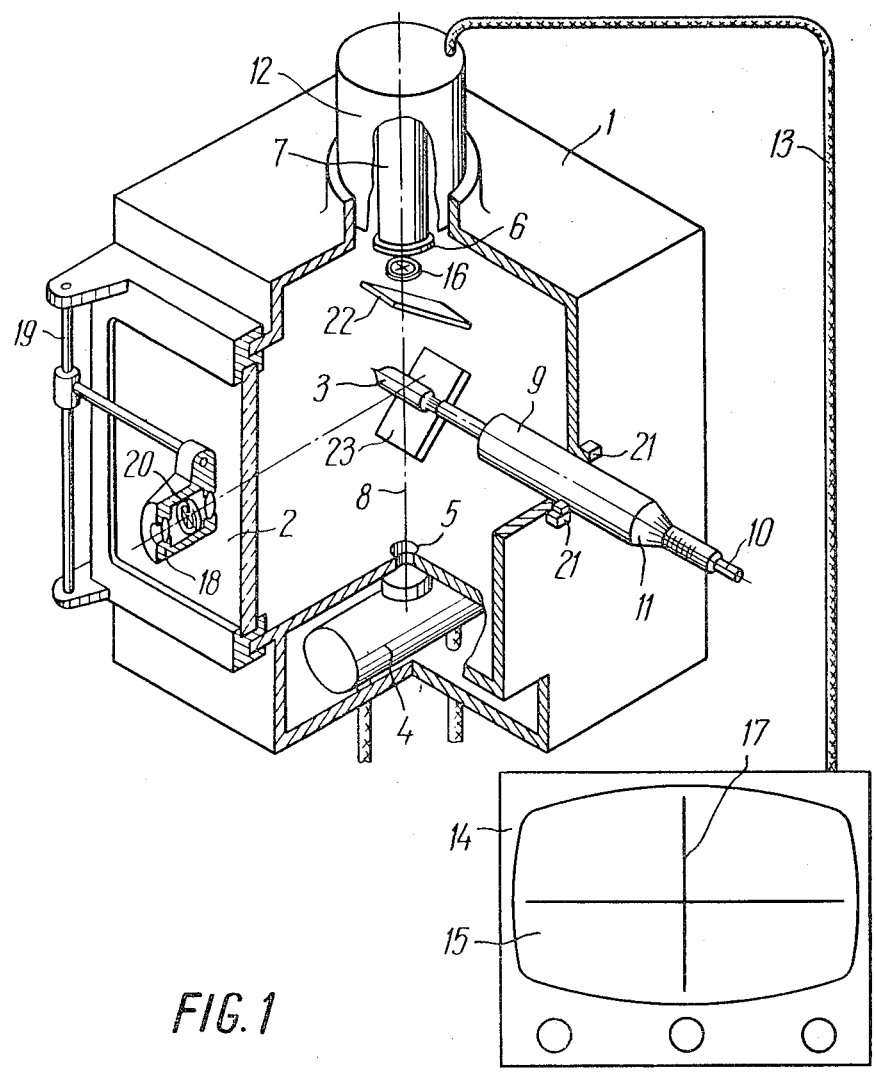
FIG. 1 is a general view of the X-ray television measuring microscope according to the invention with a working chamber shown in section.

The X-ray television microscope shown in FIG. 1 comprises a working chamber 1 having a window 2 for visual observation of the object 3 being examined. All walls of the working chamber 1 have radiation protection. Disposed within the working chamber 1 are a source 4 of X-radiation and a diaphragm 5 shaping a narrow beam of the X-radiation directed onto a target 6 of an X-ray television converter 7. In this case the centre of the target 6 is located on the axis 8 of the radiation beam. The object 3 to be examined is placed in the path of the beam of X-radiation and is secured to the end of a manipulator 9 controlled by a handle 10 located beyond the working chamber 1. The manipulator 9 effects the measuring displacements of the object 3 in the direction normal to the axis 8 of the beam. The reading of the coordinates of the measuring displacement of the object 3 is effected with the help of a reading device with a dial 11 located at the outside end of the manipulator 9.

The shadow image of the object radiated by the X-rays is projected onto the receiving target 6 of the X-ray television converter 7, while the video signals appearing in the process of operation of the converter 7 amplified by a preamplifier, which together with the X-ray television converter is included into the equipment of a transmitting television camera 12, are directed through a cable 13 to a television monitor 14 whose screen 15 is used for observing an enlarged image of the object 3 being examined. Located on the path of the beam of X-rays directly before the target 6 of the X-ray television converter 7 is a sighting cross 16 for the X-ray shadow image. The sighting cross is made of a material opaque for X-rays and provides for a clear shadow 17 observed on the screen 15 of the monitor 14. The centre of the cross 16 is set accurately on the axis 8 of the beam of X-rays, while the cross 16 itself is rigidly secured relative to the target 6 of the X-ray television converter 7 and the transmitting camera 12.

The optical sighting device 18 is located beyond the working chamber 1 on a guide 19 allowing it to be moved parallel to the axis 8 of the beam of X-rays. The optical sighting device 18 comprises a cross 20 which makes it possible to direct and fix the optical axis of the device 18 relative to the axis 8 of the beam of X-rays normal thereto, in which case the mutually perpendicular axial lines of the cross 20 are positioned so that one of them is parallel to the axis of radiation and the other is perpendicular to the direction of the measuring displacement of the object 3 effected with the aid of the manipulator 9.

By means of limiting supports 21 the manipulator 9 can rotate the object 3 about the axis of the manipulator 9 accurately through an angle of 90° to provide for observation of the object 3 through the optical sighting device 18 in the same direction in which it was radiated by the X-rays. If the rotation of the object through an angle of 90° is undesirable, mirrors 22 and 23 are used for the same purpose, which mirrors are made of a material poorly absorbing the X-radiation and which, with the help of the optical sighting device 18, allow one to observe and sight the contours of the examined object 3 in the direction of the axis 8 of radiation.

Figure 2:
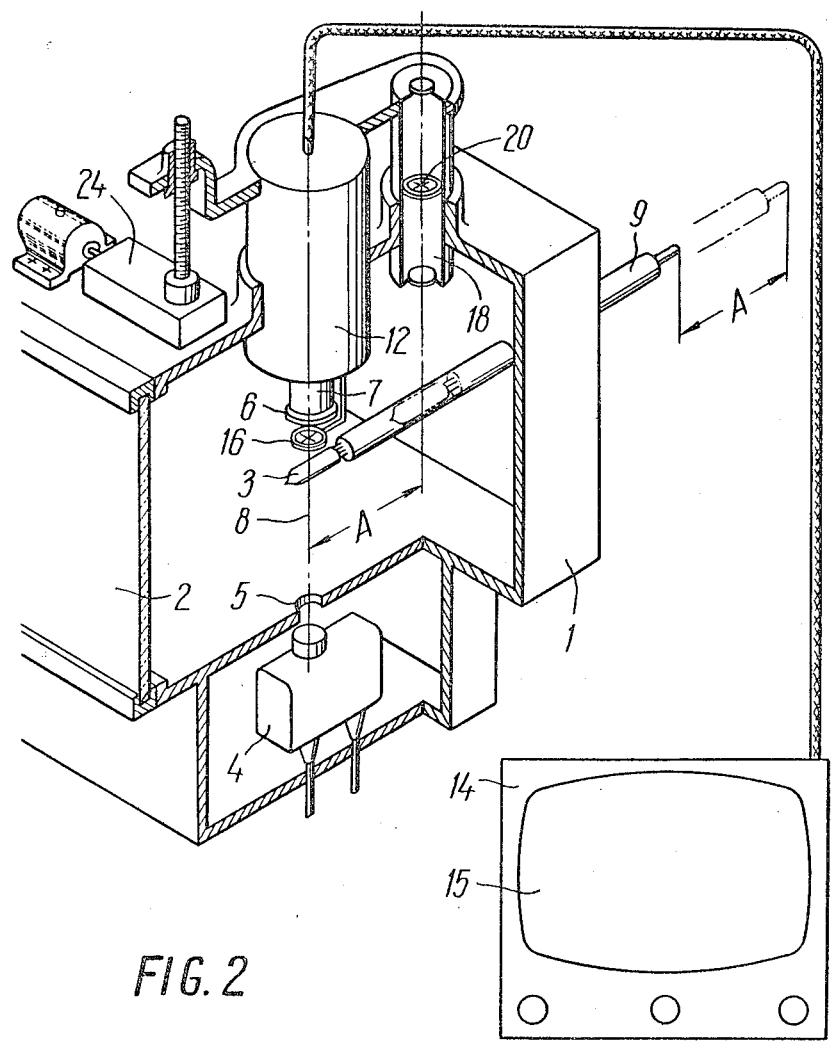
FIG. 2 is a version of arrangement of the optical sighting device according to the invention.

Shown in FIG. 2 is another modification of the X-ray television measuring microscope in which the transmitting camera 12 and the optical sighting device 18 are mounted on a common drive mechanism 24 and are displaced by this mechanism along the axis 8 of the beam of X-rays.

The distance "A" between the axis 8 of the beam of X-rays and the optical axis of the optical sighting device 18, which axes are parallel, is strictly definite and during the measurements is taken into account in the readings of the coordinates along the axis of the optical sighting device and along the axis 8 of the beam of X-rays. It is clear that in the described arrangement the same optical sighting device may be used for sighting the measuring displacements of the examined object in the other direction normal to the described measuring direction. For this purpose, the X-ray television microscope should be provided with an additional device for measuring displacement of the object in this direction.

The microscope operates as follows.

For conducting the measurements the predetermined orientation of the object 3 to be examined within the chamber 1 is effected by means of the handle 10 of the manipulator 9, while observing the actual position of the object 3 through the window 2 and the image of the inner structure of the object 3 on the screen 15. Then, by effecting the measuring displacement of the manipulator 9, the contour of the examined portion of the inner structure of the object 3 is moved to the shadow line 17 of the X-ray cross 16 observed on the screen 15 and the coordinates of the internal portion are read on the reading dial 11. After that, there is effected the measuring displacement of the examined object 3 until the contour of its external portion being examined coincides with the line of the sighting cross 20 of the optical sighting device 18, and then the second reading of the coordinates is effected by means of the same reading dial 11. In this case, for guiding the object onto the optical axis of the sighting device 18, the object being examined is turned through 90°, or the mirrors 22 and 23 are used.

The measured distance is found by the difference in the readings of the coordinates of the internal and external contours of the members of the examined object.

When the measurements are effected according to the version shown in FIG. 2, introduced into the readings of the coordinates is a correction for the distance "A" between the optical axis of the optical sighting device 18 and the axis 8 of the beam of X-radiation.

The application of the proposed X-ray television measuring microscope provides for a number of advantages which may be summarized as follows:

a. the microscope provides for the possibility of measuring the dimensions of the internal and external portion of the examined object and the distances therebetween and this makes it possible to manufacture more accurate and suitable articles and to simplify their final inspection;

b. the microscope provides for the possibility of checking the accuracy of assembly and the stability of technological and setting operations without dismantling or breakdown of the object under examination. Given as an example is a problem of accurate measurement of the thickness of oxide coatings on cathodes of vacuum tubes which was earlier solved by means of optical measurements of the oxide coating within the zone of its partial destruction made for the provision of the observation and reading of the coordinates of the metal core, on which the coating is applied. In the proposed X-ray television measuring microscope the reading of the core position is effected through the X-ray channel, while the examination of the surface of the oxide coating invisible for the X-rays is effected by means of the optical sighting device;

c. owing to a common reading device in conjunction with the two sighting devices, the efficiency of measurements is increased and these measurements can be effected automatically during the mass-production inspection of similar articles;

d. the proposed X-ray television microscope will find wide application in checking the dimensions of objects wherein metal and plastic components are accurately combined geometrically, as it is known that plastic components poorly absorb X-rays.

We claim:

1. An X-ray television measuring microscope intended for measuring geometric dimensions of, and distances between, elements in three dimentional objects comprising:

a radiation protection chamber;

a source of X-ray radiation emitting a beam from one fixed point and located in said radiation protection chamber;

means for movably mounting an object to be examined in the path of said X-ray beam;

means for effecting co-ordinate measuring movements of the object along two mutually perpendicular coordinates in a plane perpendicular to the axis of said X-ray beam;

an X-ray sensitive television converter for converting X-ray shadow images of the object into a video signal and being located in the path of the X-ray beam, said converter having a receiving target onto which said shadow images of the object are projected;

a first sighting-cross located directly in front of said receiving target and having cross-hairs, said first sighting cross being positioned on the X-ray beam axis so that the axis passes through the center of said cross-hairs;

at least one optical device, having a second sighting cross with cross-hairs, for observing and sighting those outer portions of the object not visible in the X-ray shadow image, the direction of the optical axis of the at least one optical device being fixed with respect to the axis of the X-ray beam and at least one line of the cross-hairs of said second sighting cross being perpendicular to the direction of the measuring movement of the object in said chamber and lying in a common plane with the line of the cross-hairs of said first sighting cross.

2. The X-ray television measuring microscope as in claim 1 wherein said optical axis of said optical device is parallel to the axis of said X-ray beam and which further includes means for moving said optical device and said X-ray sensitive television converter which is located adjacent to said optical device, in a direction parallel to the axis of said X-ray beam.

3. The X-ray television measuring-microscope as in claim 1 wherein said optical axis of said optical device is at right angles to the axis of said X-ray beam.

4. The X-ray television measuring-microscope as in claim 3 which includes means for moving said optical device in a direction parallel to the axis of said X-ray beam.

* * * * *